United States Patent

Konda et al.

Patent Number: 5,833,517
Date of Patent: Nov. 10, 1998

[54] LIGHT GUIDING PLATE AND FLAT OPTICAL SOURCE DEVICE

[75] Inventors: Akinobu Konda; Hidemi Konda, both of Yokohama City, Japan

[73] Assignee: Create Kabushikigaisha, Japan

[21] Appl. No.: 568,115

[22] Filed: Dec. 6, 1995

[30] Foreign Application Priority Data

Dec. 8, 1994 [JP] Japan ................................. 6-331208

[51] Int. Cl.$^6$ ..................................................... B21C 1/04
[52] U.S. Cl. .................................. 451/29; 451/30; 451/31
[58] Field of Search ................................ 451/29, 30, 28, 451/31, 36

[56] References Cited

U.S. PATENT DOCUMENTS

| | | | |
|---|---|---|---|
| 4,093,754 | 6/1978 | Parsons | 451/29 |
| 4,237,209 | 12/1980 | Oliver | 451/29 |
| 4,828,893 | 5/1989 | Tallman | 451/29 |
| 5,069,004 | 12/1991 | Gillenwater | 451/29 |
| 5,423,713 | 6/1995 | Mishima | 451/75 |

*Primary Examiner*—Eileen P. Morgan
*Attorney, Agent, or Firm*—Rossi & Associates

[57] ABSTRACT

A gradation pattern is formed by sandblasting a surface of a transparent substrate. The gradation pattern comprises countless recesses formed by eroding the surface structure. The distribution density of the recesses is low in the vicinity of sides on which primary illuminating light is incident, and high in the center of the pattern. As the original flat and smooth aspect of the plate is maintained between the recesses, the light guiding performance of the plate is maintained. By adjusting the gradation pattern, any desired bright/dark pattern can be obtained. The cost of manufacturing a light guiding plate and flat optical source device is reduced. A large illumination area having a high uniform brightness is made possible by sandblasting. And many applications and modes of use which were impossible with a conventional light guiding plate having a printed pattern, are now possible.

2 Claims, 11 Drawing Sheets

| SAND GRADE | No. 180 | No. 100 | No. 60 |
|---|---|---|---|
| SAND PARTICLE DIA. (μm) | 50~60 | 100~130 | 210~250 |
| SURFACE STATE (ENLARGED) | | | |
| SIZE of RECESS (μm) | 5~20 | 10~30 | 20~100 |
| DEPTH of RECESS (μm) | 2~4 | 3~7 | 5~20 |
| BRIGHTNESS of ILLUMINATION AREA | MEDIUM | HIGH | HIGH |
| PERPENDICULARTY REFLECTED LIGHT | MEDIUM | INTENSE | INTENSE |
| OBLIQUELY REFLECTED LIGHT | INTENSE | MEDIUM | MEDIUM |
| UNIFORMITY of BRIGHTNESS | GOOD | GOOD | BRIGHT SPOTS STANDOUT |

FIG. 5

LIGHT GUIDING PLATE AND FLAT OPTICAL SOURCE DEVICE

BACKGROUND OF THE INVENTION

1. Field of the Invention

The present invention relates to a light guiding plate used in advertising illuminations, flat optical sources, information display panels, clock faces or backlights for liquid crystal displays, to a method of manufacturing such a plate, and to a flat optical source device.

2. Description of the Prior Art

Edge light panel type flat optical source devices are used in advertising illuminations, flat optical sources, information display panels, clock faces or backlights for liquid crystal displays. In these edge light panel devices, primary illuminating light from an optical source unit such as an electric light bulb, neon light or cold cathode is caused to be incident from the side of a light guiding plate. The incident light is guided through a section of the plate between its front and rear surfaces, diffused in a plane, and emitted from the whole of a required illumination area to outside.

The structure and field of application of edge light panel flat optical source devices is described in Japanese Patent Application Laid-open No.s 63-62104 (advertising illuminations), 2-126501 (flat optical source panels), 3-203772 (information display panels), 2-269382 and 3-238190 (backlight liquid crystal displays). The structure of an ordinary light guiding plate and the structure of a printed pattern formed thereon are disclosed in Japanese Patent Application Laid-open No.2-126501.

One application of edge light panel flat optical source devices is the backlight used in large screen liquid crystal displays found in personal computers and word processors. For backlights used in liquid crystal displays, high uniformity of brightness in the illumination area is required.

A structure of a backlight for a liquid crystal display is disclosed in for example Japanese Patent Application Laid-open No.2-269382. Herein, the light guiding plate is interposed between a white reflecting sheet and a scattering transmitting sheet so as to form a three layer structure, and a printed pattern is formed on the surface of the plate adjacent to the white reflecting sheet. A pair of optical source units are disposed on two opposite sides of the light guiding plate.

FIG. 9A shows one example of conventional light guiding plate. On one surface 51M of the light guiding plate 51 of a transparent acryl resin is printed with non-transparent pattern 52, spots forming the pattern having mutually ordered positional relationships. The printed pattern 52 covers whole area of the surface 51M.

When assembled in a flat optical source device, the surface opposit to the surface 51M is ppositioned to face to an illumination area. A pair of line optical source units are disposed to face to sides 51A, 51B of said light guiding plate 51. And on the sides 51C and 51D which are not provided with optical source units reflecting tapes (not shown) are disposed to reflect leaking output light to center side.

As shown in FIG. 9B, the printed pattern 52 has many spots 52A, orderly positioned on a flat and smooth surface of light guiding plate 51 by way of screen printing. The spots 52A are formed by putting translucent white paint to figure layers of circles having their centers on grid points of lattice having equal horizontal and vertical intervals. Each surface area (diameter) of the spots 52A increases as a distance from the sides 51A, 51B increases. As a result, although visibility through the light guiding plate 51 can be maintained in the side parts thereof in which the spots 52A are small, visibility is not obtained at all in the middle region of the light guiding plate in which the spots 52A are big.

As shown in FIG. 9C, a flat optical source device 50 is constructed by interposing the light guiding plate 51 between a white reflecting sheet 53 and a scattering transmitting sheet 54. The white reflecting sheet 53 is disposed on a surface 51M of the light guiding plate 51, a printed pattern 52 being formed on the surface 51M. And the scattering transmitting sheet 54 is superposed on a surface 51N, the other side of the plate, which is an illumination area side.

In the flat optical source device 50, of the light guided towards the right of the plate, a part of the light which strikes a spot 52A impinges on a layer of white paint of the spot and is converted to scattered light. The remainder is normally reflected, and is guided further towards the right as shown by the dotted line. As light guided through a section of the plate 51 is progressively removed from the plate 51 through the spots 52A, the amount of guided light decreases and the density of scattered light removed from the spots 52A decreases, as the light travels further to the right away from the optical source.

For this reason, as shown in FIG. 9A, the surface area of the spots 52A is increased with increasing distance from the sides 51A, 51B, where the optical source units are disposed, so as to maintain a certain amount of scattered light.

Light which leaks out from the surface 51M of the plate 51 via the edges of the spots 52A impinges on the white reflecting sheet 53, and is converted to scattered light. This scattered light is reflected back to the plate 51.

As strongly scattered light is emitted only in the region of the spots 52A, a pattern of light and dark spots corresponding to the printed pattern 52 stands out when the plate 51 is observed from the illumination area. The scattering transmitting sheet 54 is therefore superposed to eliminate these light and dark spots, and maintain the uniform brightness required of a backlight of a liquid crystal display.

FIG. 10A and 10B are descriptive diagrams illustrating other, conventional light guiding plates. These plates have no printed pattern. FIG. 10A shows a plate for a switch panel illumination, and FIG. 10B shows a plate for a liquid crystal instrument panel.

In FIG. 10A, a flat optical source device 60 has a compact illumination area of approximate 3 cm×3 cm. A light guiding plate 61 constructed of a transparent resin material is interposed between a white reflecting sheet 63 and a scattering transmitting sheet 64. A surface 61M of the plate 61 adjacent to the white reflecting sheet 63 is uniformly sandblasted so as to give a matte finish.

In the flat optical source device 60, (1) light guided through the plate 61 is reflected at the surface 61M with a matte finish, emitted directly to the scattering transmitting sheet 64, and scattered by the sheet 64. And, (2) scattered light that has leaked out through the matte finish surface to the white reflecting sheet 63 illuminates the sheet 63 so as to form scattered reflected light.

In FIG. 10B, a flat optical source device 65 has a light emitting area of approximate 5 cm×10 cm. A light guiding plate 66 constructed of a transparent resin material is interposed between the white reflecting sheet 63 and scattering transmitting sheet 64. The plate 66 has a triangular section whereof the thickness decreases with increasing distance from an optical source side 66A, a plurality of grooves 67 being regularly disposed in a direction perpendicular to the plane of the paper in a surface 66M of the light guiding plate 66 adjacent to the white reflecting sheet 63. The intervals between the grooves 67 become narrower with increasing distance from the optical source side 66A. The flat surface between the grooves 67 is uniformly sandblasted so as to give a matte finish.

In the flat optical source device 65, (1) light guided through a section of the plate 66 leaks out from the grooves 67 so as to illuminate the white reflecting sheet 63 and generate scattered reflected light. (2) light reflected at the matte surface is emitted directly to the scattering transmitting sheet 64, and passes through the sheet 64. (3) light transmitted through the surface 66M with a matte finish illuminates the sheet 63 so as to form scattered reflected light.

In the flat optical source device 50 in FIG. 9B, uniformity of brightness may be lost due to the regularity of the printed pattern 52. For example, as shown in Japanese Patent Application Laid-open No.4-229829, unnecessary light striations may appear on the screen when the horizontal and vertical lattice intervals between the spots 52A are made smaller or the screen is made larger.

These striations can be eliminated by partially disrupting the regularity of the printed pattern 52, however tests are necessary to determine, in each individual case, where and to what extent the regularity of the pattern 52 should be disrupted, and this leads to higher manufacturing costs.

Further, even when the same light guiding plate 51 is used, non-uniformity of brightness distribution may be produced by a slight tilt of the optical source when it is installed. It is therefore necessary to examine the brightness distribution of all products after the backlight has been installed. Moreover, non-uniformity in the brightness distribution may also occur if a finished product suffers a severe shock.

Further, in the case of a large flat optical source device, the difference of surface area between the spots 52A in the vicinity of the sides 51A, 51B and in the middle region becomes larger, so it is desirable to decrease the horizontal and vertical lattice intervals between spots to prevent the spots in the pattern 52 from becoming too marked when viewed from the observation surface (illumination area). However, as the spots 52A are formed by painting with a translucent white paint which give them an opaque appearance, some degree of thickness and surface area suited to that thickness are necessary. Also, from the viewpoint of ease of screen printing, the size and pitch of the spots 52A of the printed pattern 52 cannot be set too small.

For example as shown in Japanese Patent Application Laid-open No.2-126501, if the pitch is reduced to less than 0.4 mm (65 lines/inch), uniformity in the brightness distribution of the flat optical source device is lost and the brightness level also falls.

For screen printing, pattern designing and preparation of screen pattern are necessary, and the cost of manufacturing the light guiding plate becomes excessive under small number of production. Also, since it is necessary to modify the surface area of the printed pattern depending on the composition of the printing ink, manufacture requires a great deal of trial and error and the time required to manufacture the plate increases.

In addition, the spots 52A of opaque printed patterns 52 which have individually recognizable shapes interfere with visibility through the plate 51, so the printed pattern 52 cannot be formed on both surfaces of the light guiding plate 51. Consequently, the plate can be used only for applications wherein the surface of the plate opposite the surface on which the pattern 52 is printed, is illuminated.

In other words, (1) it cannot be used in applications where it is desired to see the background through the illumination area of the plate, (2) it cannot be used in applications where illuminating light has to be emitted from both sides of the plate, (3) it cannot be used in applications where backlights having the same structure are superposed in order to raise the brightness of the illumination area (e.g. in color liquid crystal displays).

Apart from regular printed patterns, other elements (arrangements) which may be used to change the direction of light guided through a section of a plate and emit the light from the plate, are for example disordered imperfections formed by sandblasting a surface of a transparent substrate. These disordered imperfections may be replaced by a corrugated surface formed by heat transfer of a mold pattern, by shotblasting or by scratching.

However, light guiding plates that had been sandblasted were conventionally limited to flat optical devices of small surface area. In the plate 61 which has only the sandblasted matte surface shown in FIG. 10A, this limit was an area of several cm2, while in the case of the medium size area shown in FIG. 10B, the required uniformity of brightness distribution could not be obtained unless the section of the plate 66 was triangular in shape or regular scratches 67 were used together.

In the case of a conventional sandblasted light guiding plate, light reflected at transmitting imperfections in the surface of the transparent substrate is emitted obliquely, hence in comparison to the spots 52A of translucent white paint of FIG. 9B, the scattered light component returned to the surface adjacent to the optical source and the scattered light component in a perpendicular direction are too weak. In other words, the brightness is higher when the flat optical source device is viewed from an oblique direction than when it is viewed from the front of the screen.

Therefore, when such a plate was applied to a liquid crystal display, two problems remained unsolved, viz: (1) how to maintain uniformity of brightness of the light emitting area, (2) how to increase the perpendicular component and decrease the oblique component of scattered light. These problems prevented the application of such a plate to flat optical source devices of large surface area (e.g. backlights of liquid crystal displays).

SUMMARY OF THE INVENTION

The present invention was made in view of the aforesaid problems of prior arts. It aims to provide a light guiding plate which has no problems of brightness level or brightness distribution due to the shape of a regular pattern, which is economical to manufacture even when only one single device is to be made, and which lends itself to new applications by making use of the original transparency of transparent substrates. It further aims to provide a method of manufacturing such a light guiding plate, and a flat optical source device.

Therefor, it is one object of the present invetion to provide a light guiding plate for guiding primary illuminating light incident from a side between two surfaces, diffusing said light in a plane and emitting said light from an illumination area to outside, wherein at least one of said two surfaces has countless minute recesses that cannot be individually visually distinguished, the recesses having mutually disordered positional relationships, and the distribution density of the recesses increases as distance away from said side on which the illuminating light is incident increases.

In the light guiding plate each recess of countless, minute recesses reflects illuminating light guided through a section of the light guiding plate, and forms components traveling towards the surface of the plate opposite the recesses at different angles from that of the illuminating light. Illuminating light also leaks outside the plate through the recess boundaries.

Part of the former light which is incident on the opposite surface of the plate at an angle equal to or less than a critical angle leaks out, while light that is incident at an angle greater than the critical angle continues traveling within the plate by total reflection. The light that leaks outside the plate can be converted to scattered light by a scattering transmitting member or a white reflecting surface. Light reflected at a recess boundary may also be reflected again at the another recess boundary, and then emitted from the plate. Light which is emitted from the plate from the surface opposite the recesses due to reflection at recess boundaries, is referred to as reflected illuminating light.

The latter light may for example strike the white reflecting surface to be returned to the plate as scattered reflected light, which then passes through the plate to be extracted from the illumination area. Light which is extracted from the plate from a recess, and then impinges on the plate again so as to be extracted from the opposite side of the plate, is referred to as refracted illuminating light.

With increasing distance from the side on which the illuminating light is incident, the density of illuminating light guided through the plate decreases by an amount equal to the light that has leaked from the plate due to the countless recesses located within that distance, so the amount of light that can be extracted from the plate by one recess is consequently less. The density (number) of recesses is therefore increased with increasing distance from the incidence side so as to keep the brightness distribution of the flat optical source device uniform.

In conventional plates using a printed pattern, the areas of "spots large enough to be visible" were increased as the distance from the incidence side increased, but in the plate according to this invention, the distribution density of "minute recesses which cannot be individually distinguished" is increased.

Using spots in a conventional printed pattern, the path of only part of the light incident on a spot can be changed, however in the case of a recess, the path of effectively all the light incident on the recess boundary can be altered. The area of occupancy per unit surface area required to extract the same amount of light from the plate is therefore less for the recesses than for the spots. As the recesses are highly efficient in extracting light from the plate, a wide, flat surface can be retained between recesses for guiding the light properly.

A countless number of minute recesses which cannot be individually distinguished are collected together so as to form a gradation pattern on a surface. Unlike the case of a uniform matte finish, the original flat, smooth state of the plate is maintained between minute recesses, so the plate still has a proper light guiding function and a good visual field.

The spaces between the recesses are preferably left flat and smooth, and whitening can be applied to only the recesses.

Whitening is a surface treatment which causes incident light to be converted to scattered reflected light with not much directionality. In one example of whitening, minute imperfections of 1 $\mu$m or less are formed so that the recess boundaries appear white.

The effect of this whitening is to reduce the oblique component and increase the perpendicular component of the light reflected at the recess boundaries towards the opposite side of the plate as compared to the case of a simple, transparent boundary. The problem of the light emerging from the plate being biased in an oblique direction which occurs in the case of a simple, transparent boundary is thus partially alleviated.

In particular, when whitening is performed by forming minute imperfections, all the recess boundaries, illuminated by the light guided through the interior of the plate, shine white. This light generated by minute imperfections in the recess boundaries is referred to as scattered illuminating light.

It is another object of the present invention to provide a method of manufacturing a light guiding plate, wherein a surface of a transparent substrate of a brittle material is sandblast scanned, and at least one of the variables of scanning speed, scanning pitch, sand flowrate, blow pressure and the distance between a sandblasting nozzle and a surface to be treated is varied so as to form a gradation pattern on said surface.

In this manufacturing method, high speed sand particles are impacted on the surface of glass or acryl resin so as to indent the surface structure with minute recesses. This sandblasting involves scanning the surface of the plate along a predetermined scanning path.

As the minute recesses are formed at greater density with increasing distance from the side of the plate on which the light is incident, the external appearance is that of a gradation pattern.

However, as the surface of the plate between recesses, which was not indented, still has its original flatness and smoothness, the plate still has clear visibility and transparency, and its normal light guiding function due to total reflection at the front and rear surface is retained.

An acryl resin can be used as the transparent substrate, and it is perferred to use rough sand of abrasive grain size No.200 or less for the sandblast scanning.

This is typical optimum processing conditions which were determined experimentally using an acryl resin transparent substrate. Provided the conditions remain within the specified range, the parts of the plate between recesses retain their original flatness and smoothness, and the size and nature of the recesses remain within the limits required of a flat optical source device.

If on the other hand, fine sand of No.400 or above is used on the transparent substrate of acryl resin, the surface has a matte (ground glass) appearance. In this case, the normal light guiding properties due to the front and rear surfaces of the plate are lost.

If the edges of the recesses formed by the collision are worn down by sand flowing along the surface after the collision, the emergence angle of light reflected at the recess boundaries increases. This phenomenon is for example observed when the sand blow air pressure is increased above normal levels.

The recesses formed by fine sand have less depth, and the incidence surface area of light guided through a section of the plate (recess boundaries viewed obliquely) is also less.

Hence, less light is incident on the opposite surface of the plate at an angle equal to or less than the critical angle so that it emerges from the plate, and the bias of the light in an oblique direction is also marked in the light that does emerge from the plate.

Conversely, if the surface is sandblasted using very rough sand of abrasive grain size number equal to several tens, or shotblasted using steel balls of several mm, the recesses are too large so that bright spots appear in the illumination area. The discrepancy in the sizes of the recesses becomes larger, and the flat optical source device no longer has uniform brightness. The surface also appears clearly rougher when observed with the naked eye.

It is further object of the present invention to provide a method of manufacturing a light guiding plate, wherein a first sandblast scanning with first sand is applied to the surface of a transparent substrate having a layer of thin resist film, and a second sandblast scanning is performed using second sand finer than said first sand before removing said layer of resist film, whereby the surface state of only said recesses formed by said first scanning is rendered finer.

In this manufacturing method, a first sandblasting is applied to the surface of a transparent substrate on which a layer of thin resist film is formed. The material of this resist film layer is selected from materials that are indented together with the transparent substrate by collision with sand particles (first sandblasting), and otherwise do not interfere with the formation of recesses.

This resist film layer protects the surface of the transparent substrate from sand particles flowing along the surface after collision with the transparent substrate in the first and second sandblasting treatments. The thin resist film layer therefore prevents the formation of unnecessarily fine imperfections, unnecessary surface scratches and wearing of recess edges.

In particular, in the second sandblasting, finer sand is used than in the first sandblasting, so if the thin resist film layer is not used, the whole surface acquires a matte finish and the normal light guiding function is lost.

In the second sandblasting, only the recess boundaries are whitened. A special scattering reflection effect is observed at recess boundaries on which minute imperfections are formed. By making the size (pitch) of these minute imperfections of the order of the wavelength of light by selecting the diameter of the sand particles, the intensity of the scattered reflected light generated at the recess boundaries increases more than that of the light incident on the recess boundaries, and the wavelength range (color) is also shifted.

It is still another object of the present invention to provide a flat optical source device which has a light guiding plate of a transparent substrate, a surface of which is sandblasted, a white reflecting member which has a white reflecting surface facing one surface of said plate, a transmitting scattering member which is superposed on the other surface of said plate and transmits, scatters and emits incident light, and a pair of optical source units which are disposed on two opposite sides of said light guiding plate and cause generated primary illuminating light to be incident on said plate, whereby the interval areas between recesses formed by collision with sand particles in said sandblasted surface are kept flat and smooth so as to maintain said plate effectively transparent.

In this flat optical source device, illuminating light is extracted from one side of a light guiding plate, and the light guiding performance of the plate is maintained by the flat, smooth parts of the front and rear surfaces (intervals between recesses). Primary illuminating light guided through a section of the plate leaks outside the plate due to the recesses formed on the plate surface.

Of the primary illuminating light reflected at the recess boundaries, the component incident on the opposite surface of the plate at an incidence angle equal to or less than the critical angle, is emitted to the outside. The light emerging from the surface of the plate on the side of the illumination area is caused to be incident on a scattering transmitting member which converts it to scattered transmitted light having weaker directionality, and it is then emitted from the illumination area.

The primary illuminating light emitted to the outside from the recess boundaries is incident on a white reflecting member and forms scattered reflected light. Of this scattered reflected light, the component that passes through the plate is incident on the scattering transmitting member where it is further scattered and emitted from the illumination area.

It is still further object of the present invention to provide a flat optical source device which has a plurality of light guiding plate of a transparent substrate which are superposed each other, a surface of each plate being sandblasted to have a gradation pattern on its surface, an optical source unit which causes primary illuminating light to be incident on one side of said light guiding plate, a reflecting member which has a white reflecting surface facing one external surface of said plurality of light guiding plates, and a transmitting scattering member which is superposed on the other external surface of said plurality of light guiding plates and transmits, scatters and emits incident light.

The brightness level is easily raised using the transparency of the light guiding plate of this invention. The light guiding plate of this invention is basically transparent, so light from the rear is not obstructed and plates having the same gradation pattern may be superposed.

In contrast, in conventional light guiding plates having a printed pattern, the printed pattern obstructs light from the rear, so if plates are superposed, the positions in which the printed patterns are formed must be staggered with respect to each other.

BRIEF DESCRIPTION OF THE DRAWINGS

The invention will be described in greater detail with reference to preferred embodiments thereof and the accompanying drawings, wherein:

FIG. 5 shows comparative results of sandblast using different size sand particles;

DETAILED DESCRIPTION OF THE PREFERRED EMBODIMENTS

The first embodiment which may be applied to a flat optical source device as a backlight for a liquid crystal display screen of a word processor is described with reference to FIG. 1A–FIG. 6C.

In a backlight for a liquid crystal display screen, the light emitting area is reasonably large, i.e. 15 cm×25 cm, and a high uniform brightness is required over the whole of the light emitting field.

Figure 1A:
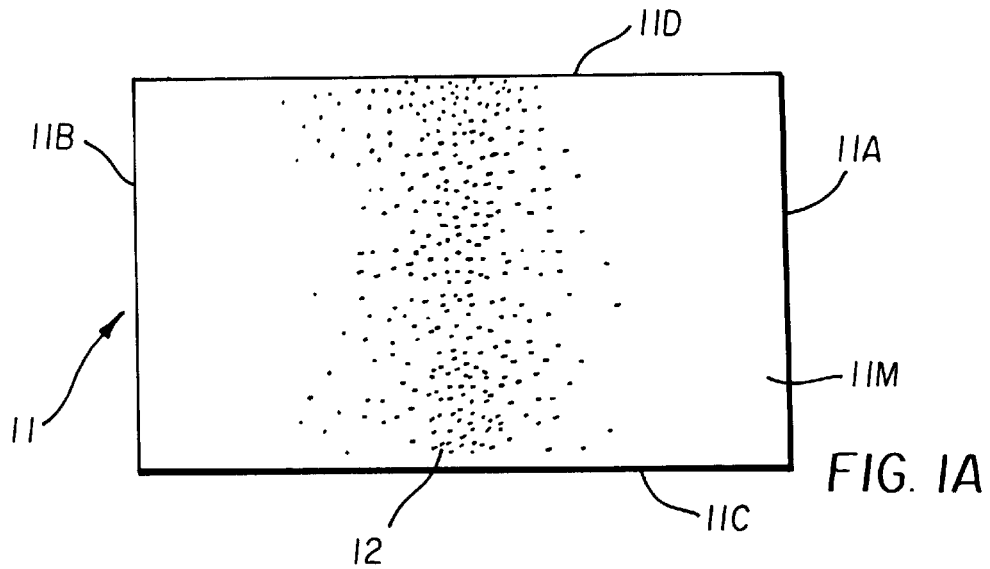
FIG. 1A is a schematic view of a light guiding plate according to the present invention.

As shown in FIG. 1A, a light guiding plate 11 has a gradation pattern 12 on one surface 11M of a transparent acryl resin substrate. The gradation pattern 12 is formed by sandblasting scanning of the surface 11M. When the surface 11M on which the gradation pattern 12 is formed is observed with a microscope, it is seen that countless minute recesses 12A having mutually disordered positional relationships are dispersed on the transparent, flat and smooth surface 11M, as shown in FIG. 1B.

The distribution density of the recesses 12A is lower, and the local density of the pattern 12 is thinner the nearer to the sides 11A, 11B on which the primary light is incident. On the other hand, the distribution density of the recesses 12A is higher the further away from the sides 11A, 11B, and the local density of the pattern 12 is highest at its center.

Figure 10A:
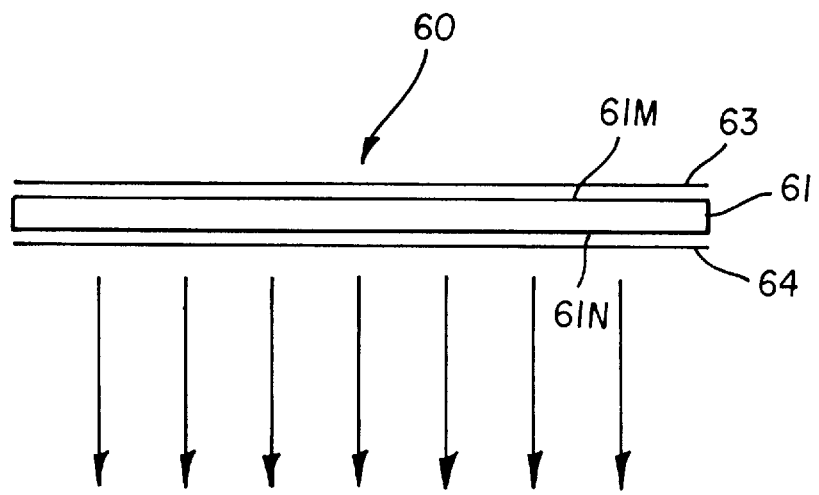
FIG. 10A is a schematic diagram showing another conventional flat optical source device.
Figure 10B:
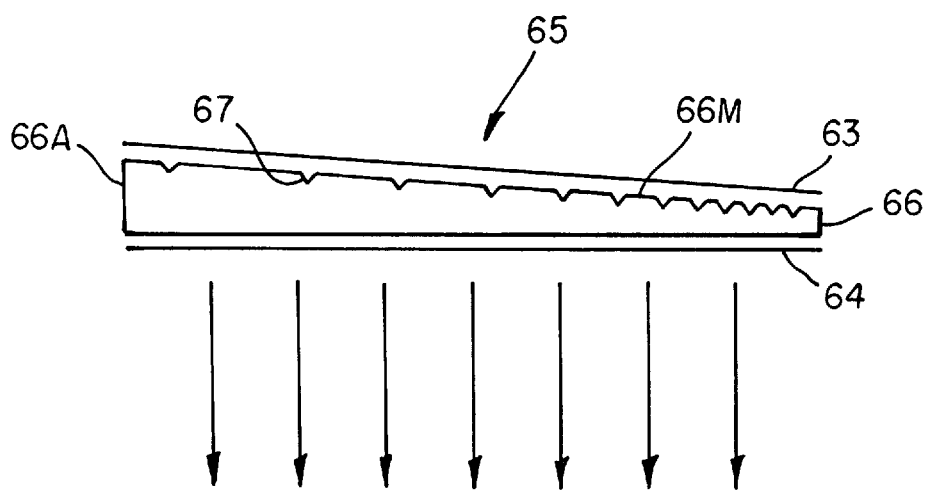
FIG. 10B is a schematic diagram showing still another conventional flat optical source device.

In contrast to the opaque, matte finish of the conventional light guiding plates 61, 66 in FIG. 10A, 10B, in the case of the light guiding plate 11, the transparent properties of the substrate are fully retained even at its center where the local density of the pattern 12 is highest. The background can therefore be clearly seen through the plate 11.

Figure 1B:
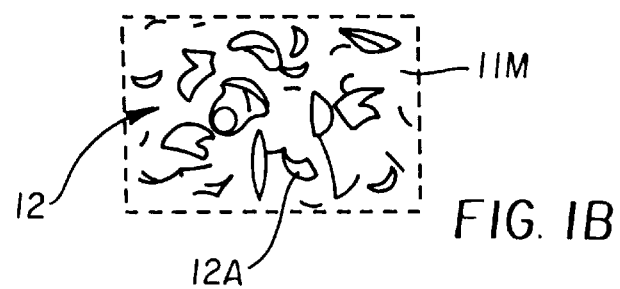
FIG. 1B is a fragmentary enlarged view of the light guiding plate shown in FIG. 1A.

As shown in FIG. 1B, countless recesses 12A formed in the surface 11M have irregular shapes and sizes. In the recesses 12A, the surface structure of the transparent substrate has been chipped out and peeled away in places. Cracks that have escaped peeling, and large recesses formed by joining two or more recesses together, can also be observed.

The boundaries of the recesses 12A have complex contours, and curls or strips due to peeling can be observed, but they are not cloudy white, and are apparently transparent and smooth. This transparency probably contributes to the transparency of the plate to some extent.

The size of one of the recesses 12A in terms of distance across is 10–30 µm. Some scratches can be seen between the recesses 12A, however these areas are flat, and the original (before sandblasting) flat, smooth characteristics of the plate are retained.

Figure 1C:
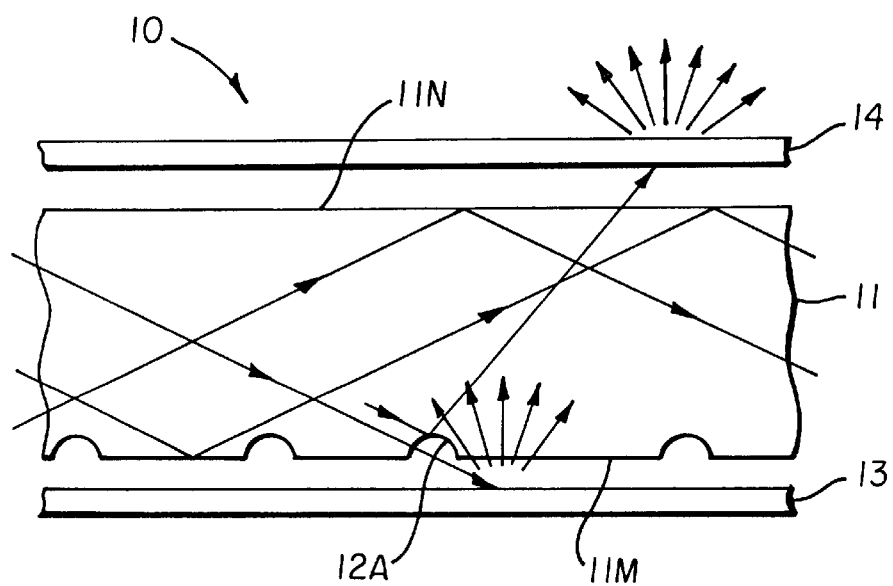
FIG. 1C is a longitudinal sectional view of a flat optical source device having the light guiding plate shown in FIG. 1A.

As shown in FIG. 1C, the flat optical source device 10 comprises a white reflecting sheet 13 and scattering transmitting sheet 14 which are superposed on the plate 11. Although not shown, the white reflecting sheet 13 and scattering transmitting sheet 14 have small corrugations or slightly embossed on the surface so that they do not adhere closely to the plate 11.

The white reflecting sheet 13 is disposed adjacent to the surface 11M formed on the recesses 12A, and the scattering transmitting sheet 14 is disposed adjacent to the surface 11N on the opposite side.

In the flat optical source device 10, primary illuminating light is guided from the left to the right due to total reflection by the flat parts of the opposite surfaces 11M, 11N. When primary illuminating light is incident on a boundary of one of the recesses 12A, a reflected component traveling toward the surface 11N of the plate 11 due to reflection at the boundary and a leak component which impinges on the white reflecting sheet 13 due to leakage from the plate 11, are respectively generated.

Of the reflected component, a component which is incident on the surface 11N at an angle equal to or less than the critical angle emerges from the surface 11N to strike the scattering transmitting sheet 14. Though, from a geometrical viewpoint, the reflected component is biased in an oblique direction, this directionality is lessened by the scattering transmitting sheet 14. The scattering transmitting sheet 14 scatters obliquely incident light so that the directionality is weakened. As a result, the perpendicular component of emitted light in the illumination area (perpendicularly reflected light) is increased, and the oblique component (obliquely reflected light) is reduced.

On the other hand, light which has leaked from the boundary of the recess 12A impinges on the white reflecting sheet 13 so as to form scattered reflected light without much bias. Of this scattered reflected light, a component which passes through the plate 11 impinges on the scattering transmitting sheet 14.

Herein, the white reflecting sheet 13 may be replaced by a glossy surface such as that of aluminum foil so as to effectively return light which has leaked from the boundary of the recess 12, back to the plate 11. However, if the white reflecting sheet 13 is a glossy surface such as an aluminum foil, the scattered reflected light is biased in an oblique direction by specular reflection and the perpendicular component (perpendicularly reflected light) of the emergent light from the plate 11 which passes through the scattering transmitting sheet 14 is remarkably reduced.

According to this embodiment therefore, the white reflecting sheet 13 is used which gives less bias to the scattered light at the cost of reflection ratio.

Figure 2A:
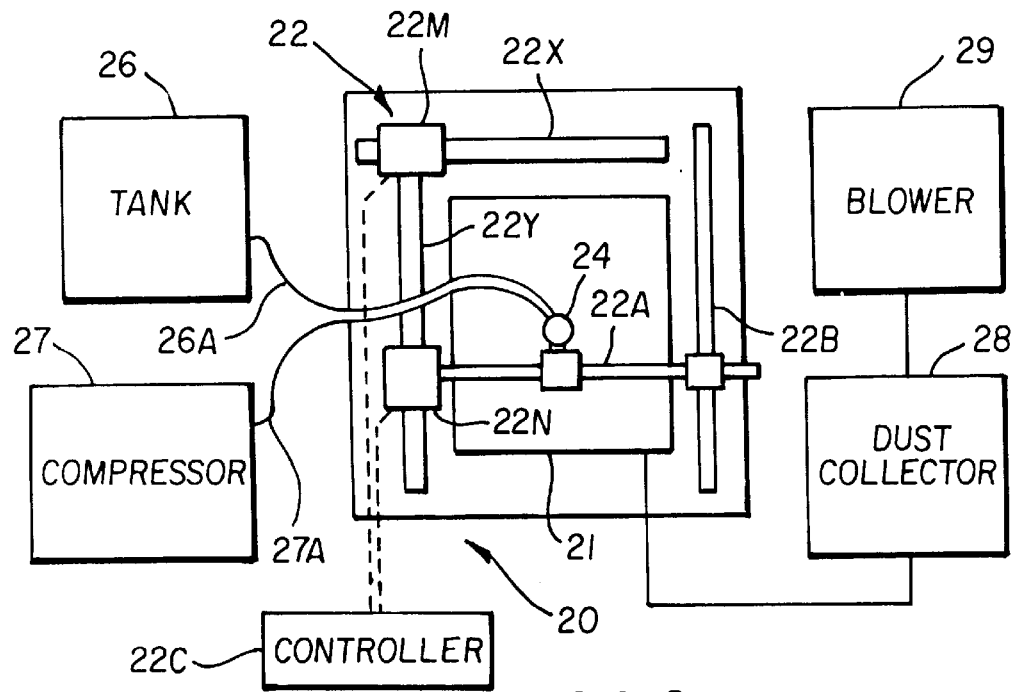
FIG. 2A is a schematic view showing a sandblast scanning device.

As shown in FIG. 2A, a sandblast scanning device 20 has a nozzle scanning mechanism 22 disposed outside a treatment chamber 21. The nozzle scanning mechanism 22 operates a central nozzle 24 which scans according to a program set in a controller 22C.

A moving platform 22M on which a track 22Y extending in the Y direction is mounted, is free to move along a track 22X extending in the X direction.

A platform 22N movable along the track 22Y is provided with an arm 22A to which the nozzle 24 is fixed. The arm 22A is supported by both the platform 22N and a direct driven bearing 22B. The direct driven bearing 22B supports the arm 22A so that the arm is movable in its axial direction.

The platforms 22M and 22N are supplied with driving power from the controller 22C. The controller 22C causes the nozzle 24 to scan by controlling the motion of the platforms 22M, 22N. The operator can set the controller 22C for any desired scanning path and speed of the nozzle 24.

Sand for sandblasting is supplied from a particle grinding tank 26 via a sand hose 26A, and compressed air is supplied from a compressor 27 via an air hose 27A. A negative pressure generated at the nozzle 24 by blowing out compressed air sets up an air suction flow in the tank hose 26A. Sand in the tank 26 is aspirated by this suction and carried out by the air flow.

The amount of sand supplied may be regulated by adjusting the mechanism of the nozzle 24 so as to increase or decrease the suction air flow inside the sand hose 26A. More specifically, the position of the discharge outlet of the jet pump, which is built into the nozzle 24 and driven by compressed air, is adjusted. The compressed air flowrate and blast pressure may be adjusted by adjusting the output pressure reduction valve of the compressor.

A blower 29 is connected to the treatment chamber 21 via a dust collector 28. The blower 29 constantly maintains the treatment chamber 21 at a negative pressure so as to prevent leakage of sand from the chamber 21 to the surrounding environment. The dust collector 28 recovers used sand particles.

In the sandblast scanning device 20, the transparent substrate fixed in the chamber 21 is blasted by compressed air and sand from the nozzle 24 which is made to scan by the scanning mechanism 22. The nozzle 24 is made to scan over a slightly wide area including the whole of the transparent substrate. Depending on the combination of scanning path and scanning speed set by the controller 22C, a gradation pattern of any desired density and variation (tone) can be formed on the surface of the transparent substrate.

Figure 2B:
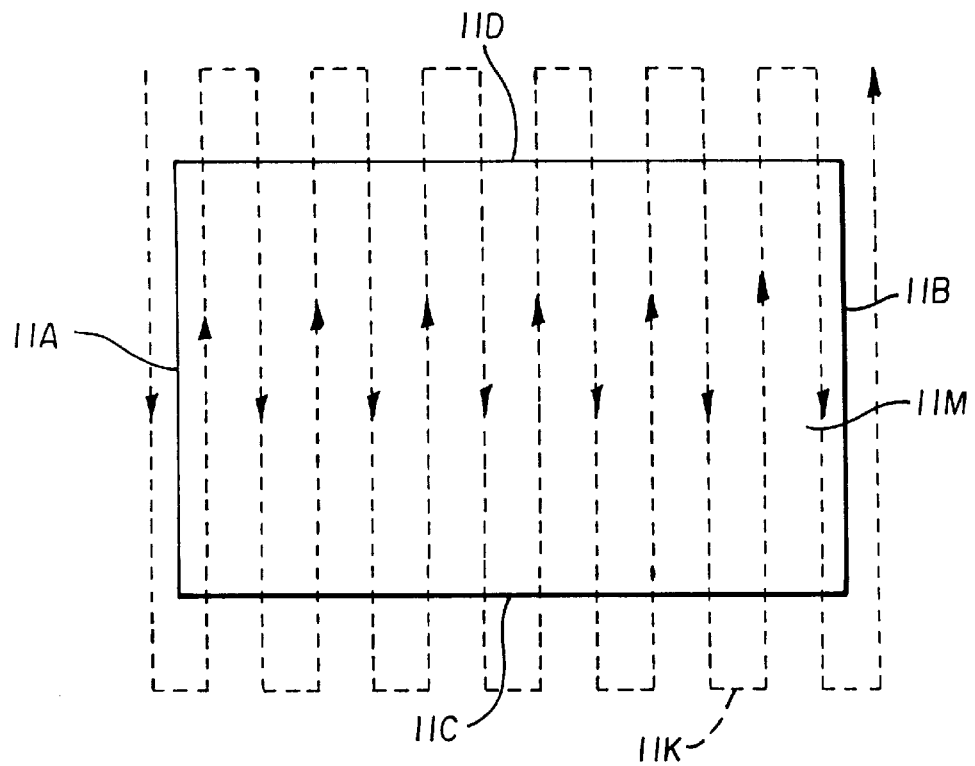
FIG. 2B is a schematic view illustrating a sandblast scanning path.

As illustrated in FIG. 2B, the nozzle 24 is made to scan the surface 11M of a transparent acryl resin substrate along a scanning path 11K shown by the dotted line. Back-and-forth scanning lines parallel to the sides 11A, 11B on which the primary illuminating light is incident, are shifted by a predetermined pitch in the direction paralell to the sides 11C, 11D so as to form a continuous pattern. To perform adjacent scanning traces, the scanning direction is reversed.

Different scanning speeds may be set for each scanning line in the direction of the sides 11A, 11B. For scans close to the sides 11A, 11B on which the primary illuminating light is incident, the scanning speed is increased so that the impact density of sand on the surface 11M is reduced. The scanning speed is reduced as the center of the substrate is approached so as to increase the impact density on the surface 11M.

Figure 3A:
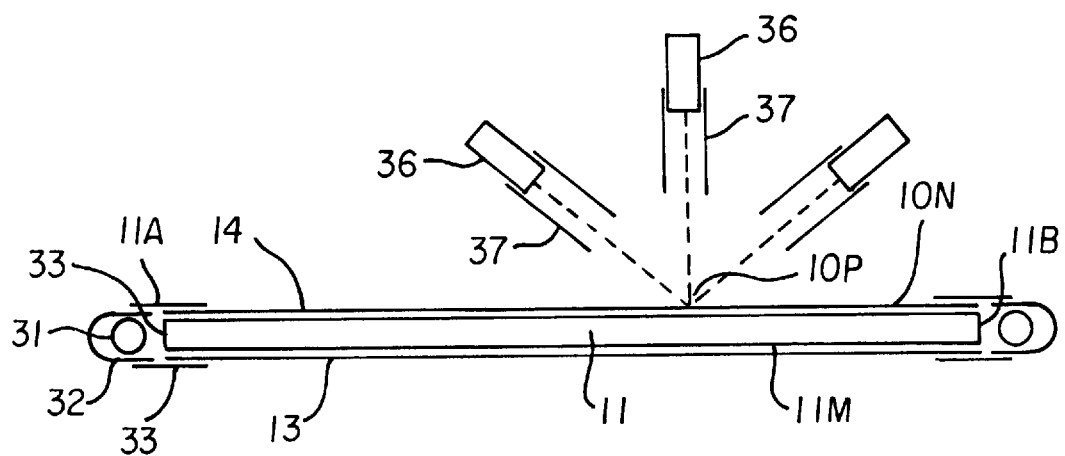
FIG. 3A is a diagram showing a method of evaluating the flat optical source device.

FIG. 3A shows a flat optical source device using a light guiding plate 11 on which a gradation pattern 12 is formed by sandblast scanning. This device can be used as the backlight of a liquid crystal display device. Cold cathodes tubes 31 are disposed respectively facing the sides 11A, 11B of the plate 11.

Reflecting members 32 are disposed around the cold cathode tubes 31 in parts of the apparatus not adjacent to the end faces of the sides 11A, 11B. The reflecting members 32 causes primary illuminating light emitted by the cold cathode tubes 31 to be incident into the plate 11 effectively.

The scattering transmitting plate 14 is superposed on the illumination area 10N of the light guiding plate 11, and the white reflecting sheet 13 is superposed on the opposite side of the plate 11. Opaque sheets 33 are superposed on strip-shaped areas near the end faces 11A, 11B so as to prevent unnecessary leakage of light from the cold cathode tubes 31 and plate 11.

The brightness level and distribution of the illumination area 10N may be evaluated by measuring the intensity of perpendicularly reflected light at a plurality of measurement points 10P set in the illumination area 10N. An illumination sensor 36 is installed at the base of a cylinder 37, this sensor being supported at a predetermined distance from the measurement points 10P. When the sensor is supported perpendicular to the illumination area 10N, the intensity of perpendicularly reflected light is measured, and when it is supported at an oblique angle with respect to the illumination area 10N, the intensity of obliquely reflected light is measured. The brightness level of the illumination area 10N is determined from the sum of the intensities of perpendicularly reflected light at the plurality of measurement points 10P.

Figure 3B:
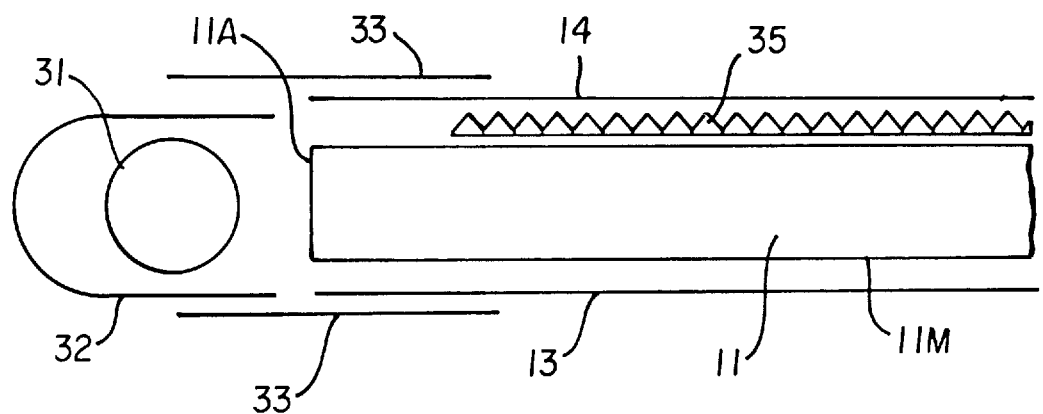
FIG. 3B is a sectional view showing a flat optical source device provided with a lens sheet.

In liquid crystal display backlight applications, it is required that the brightness distribution should be uniform over the whole of the illumination area 10N, and it is also desired that the brightness level is high. To raise the brightness level, a lens sheet 35 may be used as shown in FIG. 3B.

The lens sheet 35 is disposed between the light guiding plate 11 and scattering transmitting sheet 14. The lens sheet 35 is a transparent resin sheet having a surface formed with a row of triangular pillars. The lens sheet 35 bends light emerging from the plate 11 and traveling in an oblique direction, in a perpendicular direction. In this way, obliquely reflected light decreases and perpendicular reflected light increases in the illumination area 10N.

Figure 4A:
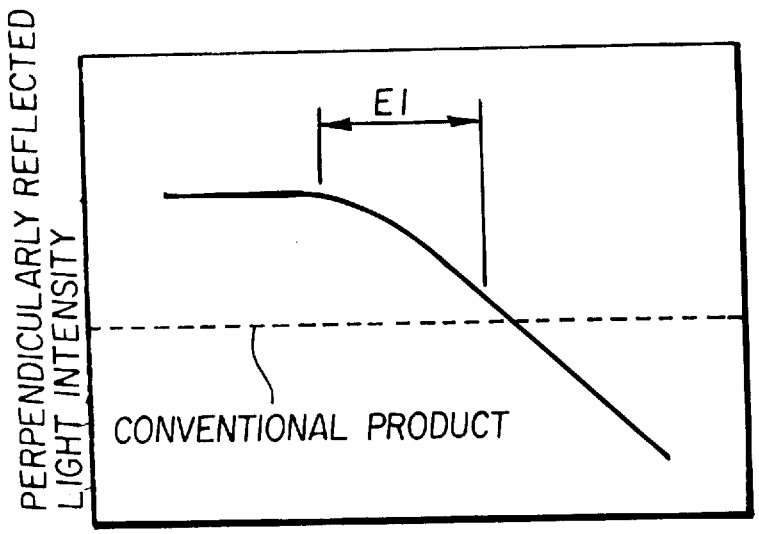
FIG. 4A shows experimental results obtained under various conditions.
Figure 4B:
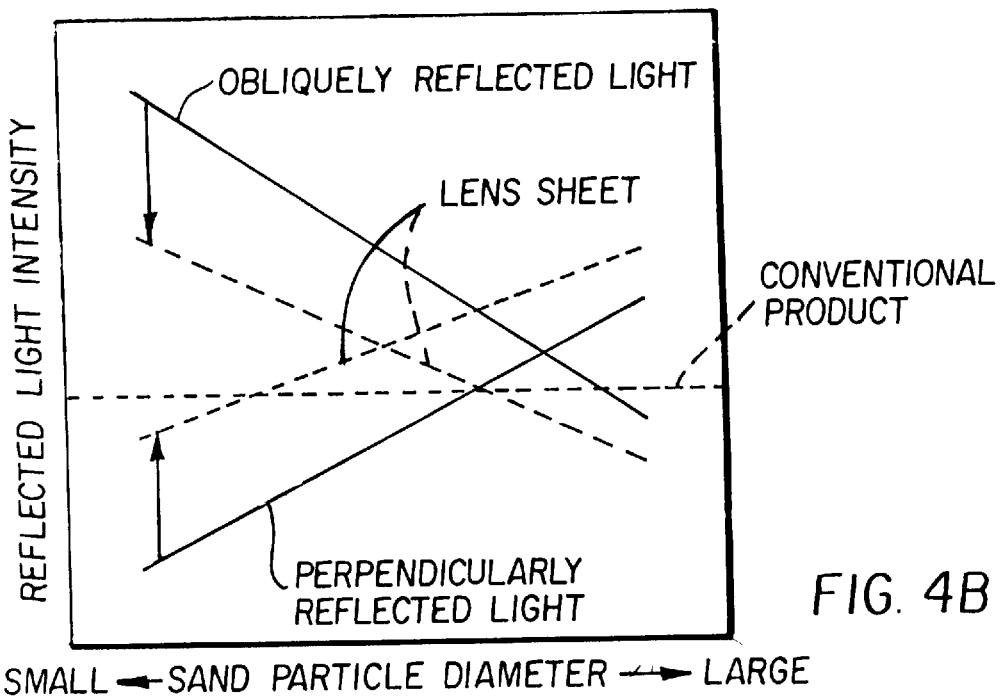
FIG. 4B shows experimental results obtained under various conditions.

FIG. 4A and 4B show experimental results for a light guiding plate treated by a sandblast scanning device and evaluated by the method and under the conditions shown in FIG. 3A.

FIG. 4A shows the relation between scanning speed, sand supply amount, blast pressure, scanning pitch and intensity of perpendicularly reflected light. These conditions vary the impact density and impact energy of sand particles on the surface of the plate so as to vary the distribution density of recesses formed on the surface of the transparent substrate.

Decrease of scanning speed, increase of sand supply amount, increase of blast pressure and decrease of scanning pitch all increase the recess distribution density. However, the maximum amount of light that can be extracted from the illumination area through the gradation pattern is limited to one supplied from the optical source and guided through the plate.

Hence, as the number (density) of recesses on the surface of the light guiding plate increases, perpendicularly reflected light also increases at first, but if the number of recesses is increased further, the total light amount that can be extracted from the illumination area levels off.

If the number of recesses is further increased and the surface of the light guiding plate become rougher, the light guiding performance of the plate due to its front and rear surfaces gradually declines. Also, the transparency of the light guiding plate decreases so that the visibility of the background become lessened.

According to this embodiment, therefore, a range of conditions E1 has been selected wherein a somewhat reduced light amount is extracted from the plate while the light guiding performance and transparency of the plate are a maximum.

As shown in FIG. 4B, as the diameter of the sand particles used for sandblasting increase, perpendicularly reflected light becomes more intense and obliquely reflected light becomes weaker. Also, when the number of scattering transmitting sheets is increased or the lens sheets are added, obliquely reflected light is reduced so that the proportion of direct reflected light is increased. Increasing the number of scattering transmitting sheets or lens sheets however increases the transmittance losses and raises the material cost of the flat optical source device.

According to this embodiment, sand rougher than No.100 which is generally used in conventional sandblasting (matte finishing) of light guiding plates, is used to provide more of the perpendicularly reflected light.

However, in the application for liquid crystal display backlights, it is necessary to maintain uniformity of brightness of the illumination area at a high level, so it is not expedient to use sand which is excessively rough. If excessively rough sand is used, it becomes possible to see the individual recesses, and bright spots stand out in the illumination area even through the scattering transmitting sheet.

FIG. 5 shows comparative results using three sand particle diameters, viz. No.s 180, 100 and 60. In combinations of various sandblasting conditions according to this embodiment, the best results were obtained using No.100 sand.

When No.180 sand was used, the light guiding plate was impacted by sand particles having an average diameter of 50 μm so as to form recesses which were on average 10 μm across and 3 μm deep. When a lens sheet was used, perpendicular reflected light becomes more intense than in the case of a conventional light guiding plate using a printed pattern, but not so much perpendicular reflected light was obtained as with a conventional plate in the absence of the lens sheet.

When No.100 sand was used, the plate was impacted by sand particles having an average diameter of 110 μm so as to form recesses which were on average 20 μm across and 5 μm deep. More perpendicularly reflected light can be obtained than in the case of a conventional light guiding plate even if the lens sheet is not used, and if the lens sheet is used, the brightness is further increased.

When No.60 sand was used, the plate was impacted by sand particles having an average diameter of 220 μm so as to form recesses which were on average 50 μm across and 9 μm deep. The same amount of perpendicularly reflected light can be obtained as in the case of a conventional light guiding plate even if the lens sheet is not used, however bright spots are formed which stand out in the illumination area of the scattering transmitting sheet. There is a great deal of difference in the size and shape of the recesses, some recesses more than 100 μm across being directly visible with the naked eye.

This is probably due to the fact that the sand particles are irregular, and as the shape of the impacting part is not the same, there is heavy peeling due to difference of impact conditions and repeated impacts.

Figure 6A:
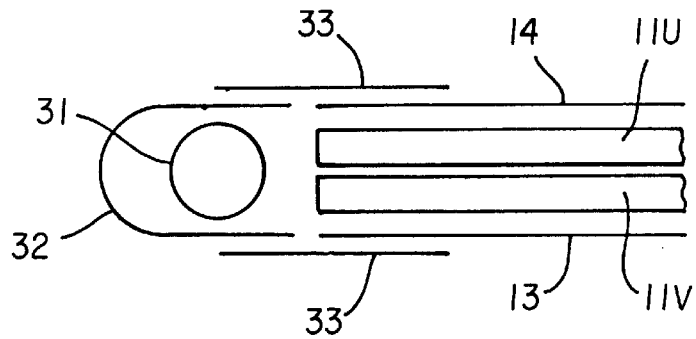
FIG. 6A shows an arrangement of a flat optical source device having two superposed light guiding plates according to the present invention.
Figure 6B:
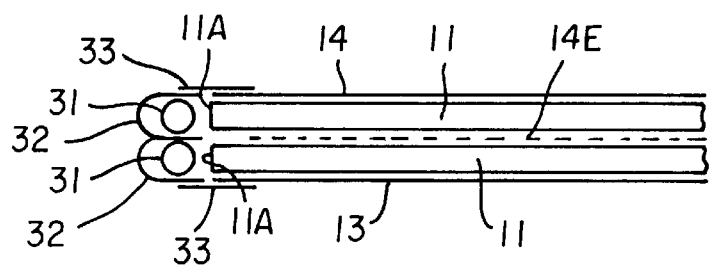
FIG. 6B shows another arrangement of a flat optical source device.
Figure 6C:
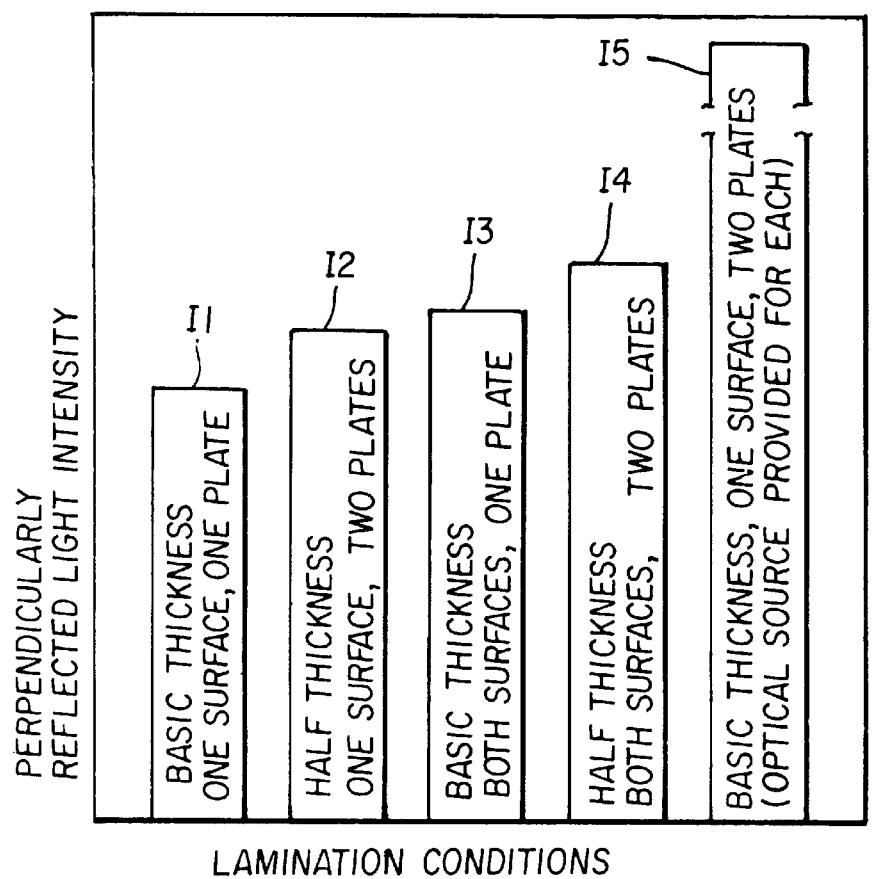
FIG. 6C shows comparative results under different lamination conditions of light guiding plates.

FIGS. 6A–6C show lamination conditions and comparative results for a light guiding plate on which a gradation pattern is formed using No.100 sand. Whereas a conventional light guiding plate using an opaque printed pattern obscures light from the rear, the plate according to this embodiment which is basically transparent, transmits light from the rear. Consequently, even if plates having the same gradation pattern are superposed, there is not much loss of uniformity of overall brightness. A light guiding plate having another gradation pattern may also be superposed on a plate which does not have sufficient uniformity of brightness in order to correct for this.

In FIG. 6A, light guiding plates 11U, 11V having ½the thickness of the plate 11, are superposed. The plates 11U, 11V have gradation patterns formed separately by sandblast scanning. The gradation patterns of the plates 11U, 11V are both denser in the center and thinner at both ends. A common scattering transmitting sheet 14 is superposed on the surface of the illumination area of the plate 11U, and a common white reflecting sheet 13 is disposed on the surface opposit to the illumination area of the plate 11V.

Condition I2 in FIG. 6C is the formation of a gradation pattern on one surface of each of the plates 11U, 11V. Condition I4 in FIG. 6C is the formation of a gradation pattern on both surfaces of each of the plates 11U, 11V.

In FIG. 6B, two optical source units of the type shown in FIG. 3A are superposed so as to double the brightness level. However, in order that the light from the (lower) plate 11 (adjacent to the white reflecting sheet 13) is not obstructed, the white reflecting sheet and scattering transmitting sheet are not disposed in the gap between the two plates 11. Condition I5 in FIG. 6C corresponds to this combination.

FIG. 6C shows comparative results for the lamination conditions illustrated in FIG. s 6A and 6B.

Condition I1 is the case where one surface of the plate 11 shown in FIG. 3A is sandblast scanned.

Condition I2 is the case where one surface of each of the two ½thickness plates 11U, 11V shown in FIG. 6A is sandblast scanned. This gave an approximately 10% improvement compared to the condition I1.

Condition I3 is the case where both surfaces of the plate 11 shown in FIG. 3A are sandblast scanned. This gave an approximately 15% improvement compared to the condition I1.

Condition I4 is the case where both surfaces of each of the two ½thickness plates 11U, 11V are sandblast scanned. This gave an approximately 10% improvement compared to the condition I3.

Condition I5 is the case where two of the plates 11 are superposed, and optical sources are provided for each of them as shown in FIG. 6B. This gave an improvement of almost two times compared to condition I1.

By selecting the treatment conditions of sand particle diameter, scanning speed and blast pressure based on the experimental results shown in FIG. 4A–FIG. 6C, and by adjustig the gradation pattern, the uniformity of brightness in the illumination area can be further improved.

Figure 7A:
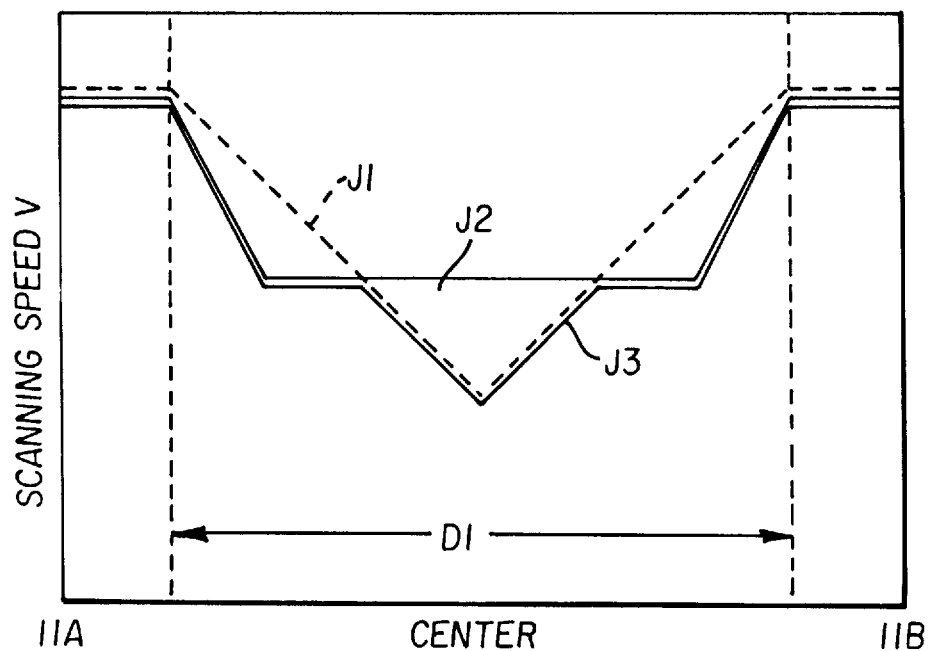
FIG. 7A is a diagram showing conditions of the adjustment of sandblast scanning speed.
Figure 7B:
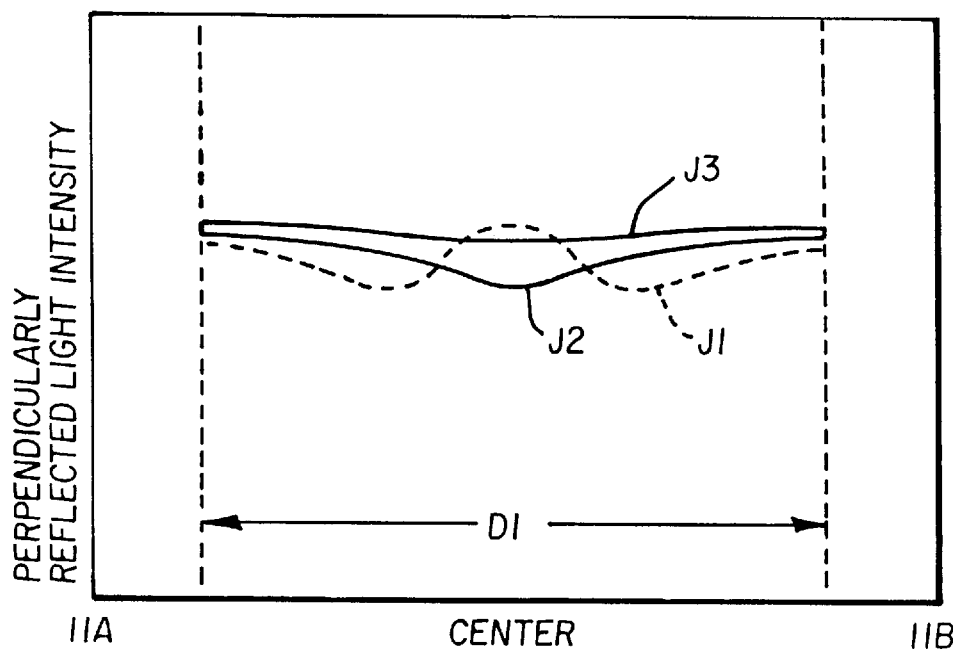
FIG. 7B is a diagram showing intensity of perpendicularly reflected light under the conditions shown in FIG. 7A.
Figure 8A:
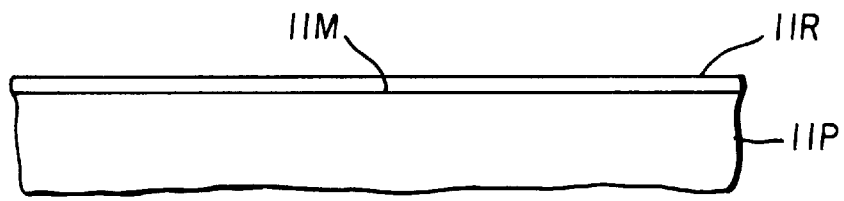
FIGS. 8a–8d is a diagram showing a method of manufacturing a light guiding plate according to a second embodiment of the present invention.
Figure 8B:
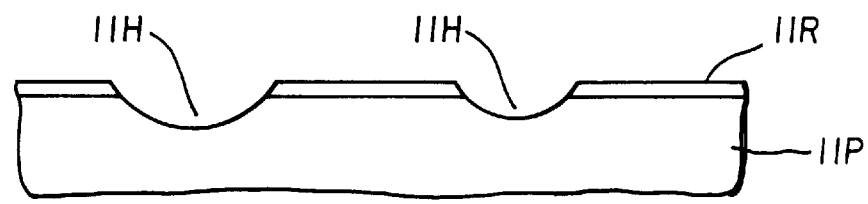
Figure 8C:
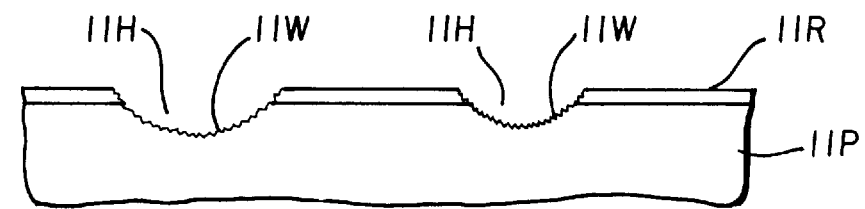
Figure 8D:
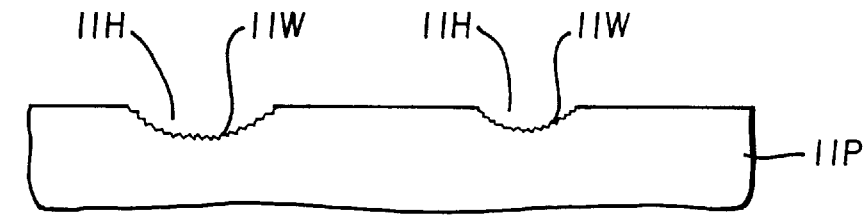
Figure 9A:
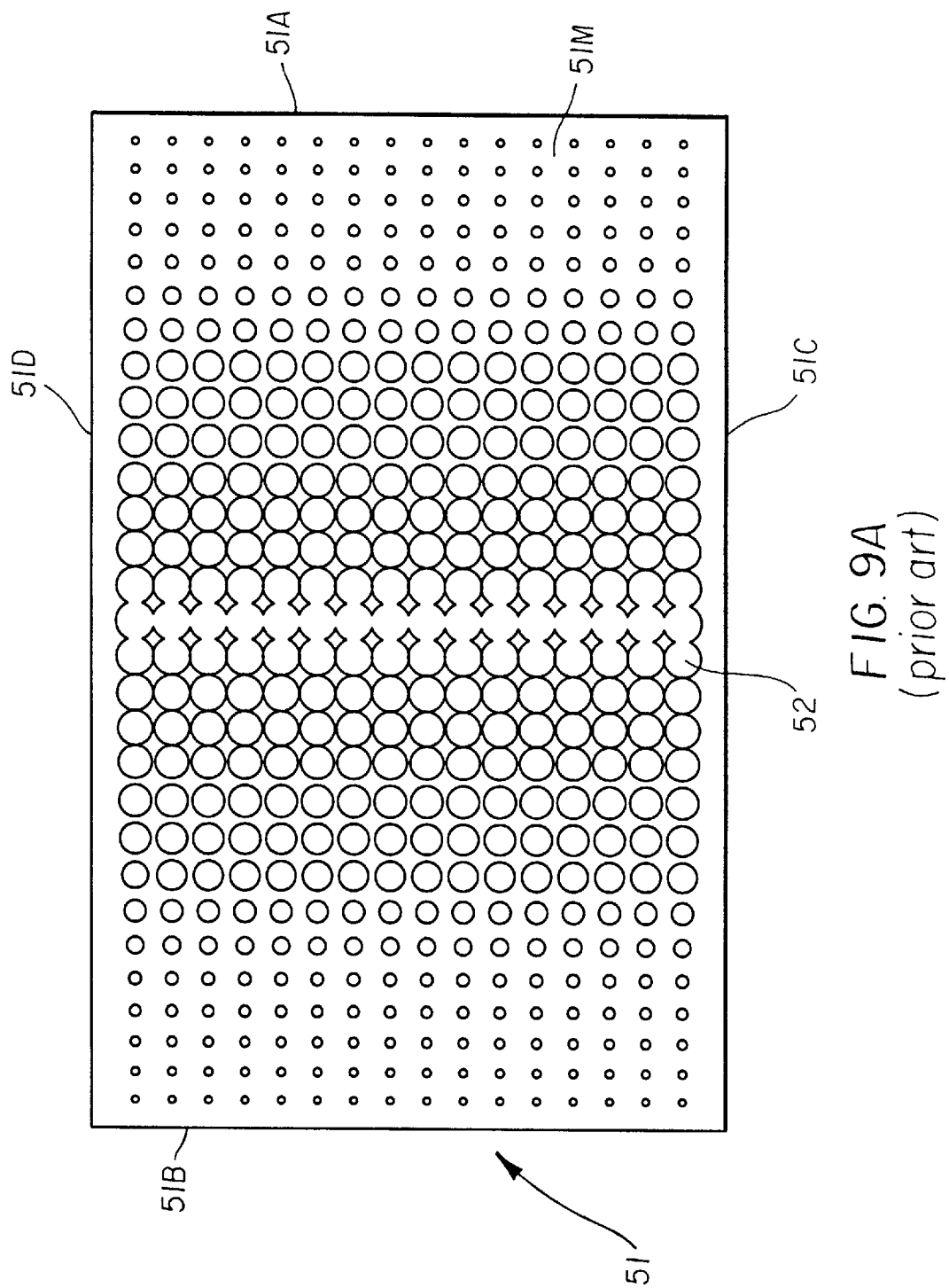
FIG. 9A is a schematic diagram showing a conventional light guiding plate.
Figure 9B:
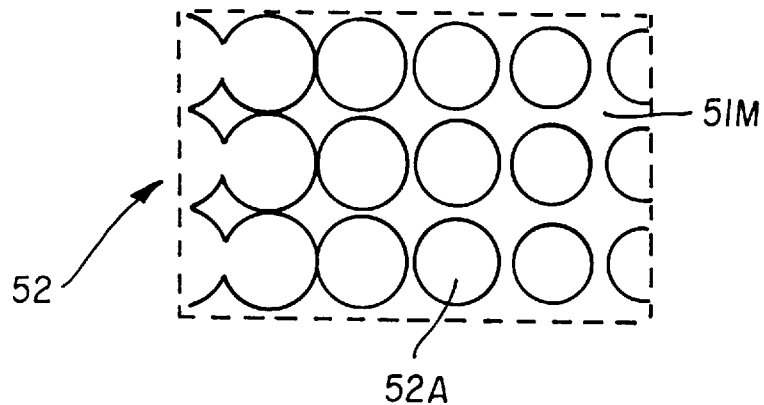
FIG. 9B is a fragmentary enlarged view of the light guiding plate shown in FIG. 9A.
Figure 9C:
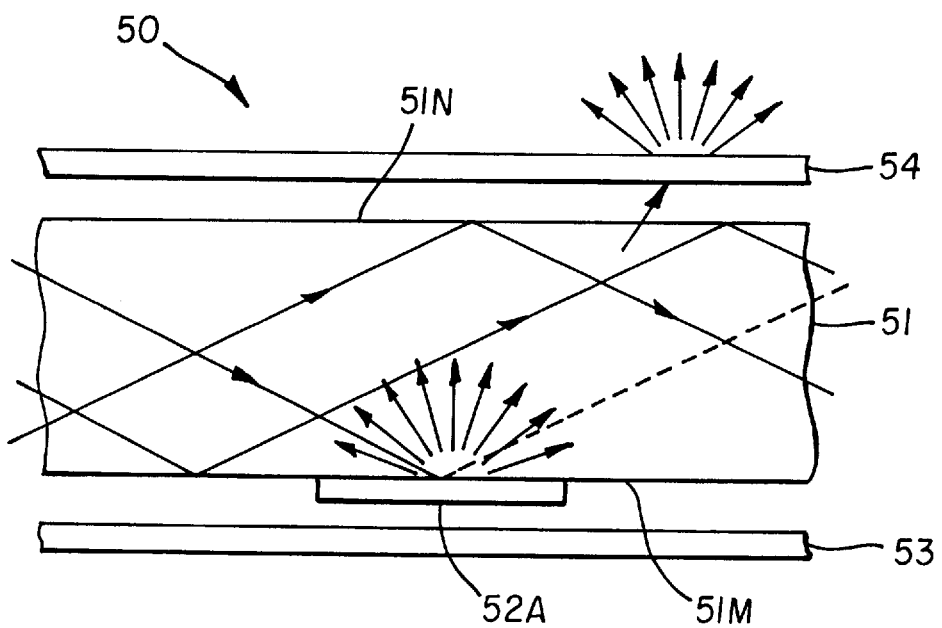
FIG. 9C is a longitudinal sectional view of a flat optical source device having the conventional light guiding plate.

FIG. 7A and 7B show the results obtained by adjustig scanning speed. In FIG. 7A, under the condition J1 the scanning speed in the scanning path shown in FIG. 2B, is linearly decreased from the side 11A to the center of the illumination area D1, and linearly increased from the center to the side 11B. In the case of condition J1, an increase of perpendicularly reflected light was observed in the center of the illumination area D1 as shown in FIG. 7B.

Under the condition J2, the relative speed in the center of the illumination area D1 is set flat. In the case of condition J2, overall uniformity of brightness was maintained, but a dip was observed in the center of the illumination area. By setting a condition J3 wherein the condition J1 was added to the condition J2, an effectively uniform brightness distribution was obtained.

The light guiding plate according to the first embodiment may be used without modification to replace a conventional light guiding plate having a printed pattern in a conventional flat optical source device (backlight for liquid crystal display device). Due to this replacement the brightness level of the illumination area of the flat optical source device is improved, and if a lens sheet is also used in conjunction, the brightness level of the illumination area is further improved.

In the light guiding plate according to the first embodiment, light guided through a section of the plate is extracted from the plate by the minute recesses. When compared to the 1 mm spots of a conventional printed pattern, the diameter and surface area of the 20 $\mu$m recesses produced by No.100 sand are $\frac{1}{50}$ and $\frac{1}{2500}$ of the printed spots respectively. As the recesses are so small, both of the two conditions of disordered positional relationships and variation of distribution density (gradation) are satisfied so that uniformity of brightness of the illumination area can be obtained.

In the light guiding plate according to the first embodiment, as the recesses have disordered positional relationships, there are none of the disadvantages due to the regularity as seen in a printed pattern, and uniformity of brightness is not impaired due to slight differences in the conditions of the optical source. Therefor if the plate has been inspected, there is no need to check uniformity of brightness after the flat optical source device is assembled.

The light guiding plate according to the first embodiment is easier to design, manufacture, adjust and remake the gradation pattern than in the case of a conventional printed pattern. Less time is required from treatment to evaluation, and the equipment and materials cost is lower than in the case of a conventional printed pattern.

If a non-uniformity of brightness should appear, further treatment may be prescribed based on brightness uniformity measurements and the uniformity can be corrected by additional sandblast scanning. This kind of repair was impossible with conventional printed patterns.

Using the light guiding plate of the first embodiment, applications and modes of use are possible which were impossible using a conventional light guiding plate having an opaque printed pattern. These are (1) applications where illuminating light is extracted from both surfaces of the plate, (2) applications requiring visibility through the plate, and (3) modes of use wherein brightness level is increased by superposing the plates.

Hence, even when the plate is used in advertising illuminations, advertising panels, wall illuminations, window illuminations, information display panels or clock faces, functions may be provided which were impossible with a conventional printed pattern.

In FIG. 6B, two plates 11 were directly superposed, however a thin scattering transmitting sheet E may be interposed between them so as to weaken the directionality of the light emitted from the lower plate 11. Three or more plates 11 may also be superposed. Also, instead of providing cold cathode tubes 31 for each of the plates 11, a common cold cathode tube may be provided for a plurality of the plates 11.

The light guiding plate according to this embodiment is not limited to applications requiring a uniform brightness distribution in an illumination area of a flat optical source device, and special gradation patterns may also be easily designed, manufactured or modified to make specific areas of an illumination area brighter or darker.

Therefore, even when the plate is applied to advertising illuminations, advertising panels, wall illuminations, window illuminations, information display panels or clock faces, bright or dark areas may be formed to provide diverse functions.

FIG. 8 shows a method of manufacturing a light guiding plate as a second embodiment. Steps in the manufacturing process are illustrated in order of (a)–(d). Herein, the boundaries of the recesses produced by the first sandblast scanning are whitened. More specifically, minute imperfections are formed by a second sandblast scanning only on the recesses formed by the first sandblast scanning.

In step (a), a resist layer 11R is formed on a surface 11M of a transparent acryl resin substrate 11P. The material for the resist layer 11R is selected from protecting materials that have the following characteristics: (1) the material is easily crushed by the impact of sand particles, (2) the material fractures together with the surface of the transparent substrate lip where impact occurs so as not to impede the formation of recesses 11H, (3) the material does not easily remain at the boundaries of the recesses 11H after peeling, and (4) the material adheres closely to the surface 11M at positions other than those of the recesses 11H.

In step (b), a first sandblast scanning is performed on the transparent substrate lip formed in the step (a) so as to form the recesses 11H which are approximately 20 $\mu$m across.

In next step (c), the second sandblasting scanning is performed using finer sand than that used in the first sandblast scanning. Minute imperfections 11W are formed only at the boundaries of the recesses 11H. The surface between the recesses 11H is protected by the resist film 11R so that the effect of the second sandblast scanning does not extend to the transparent substrate 11P beneath the resist layer 11R.

Subsequently, in step (d), the resist layer is peeled away.

As the boundaries of the recesses 11H formed in the manufacturing method of the second embodiment are covered by the minute imperfections 11W, they have a scattering effect on light incident on and reflected by the boundaries, or on emergent light. Hence, even if the performance of the white reflecting sheet 13 or scattering transmitting sheet 14 in FIG. 3A declines, the uniformity of brightness distribution is maintained without leading to an increase of obliquely reflected light or decrease of perpendicularly reflected light. Depending on the application, the white reflecting sheet 13 or scattering transmitting sheet 14 may be omitted.

By arranging the size of the imperfections 11W (pitch) to be of the order of one light wavelength by suitably selecting the sand particle diameter, a special function may be imparted to the boundaries of the recesses 11H. When the imperfections 11W are of the order of one light wavelength, there is a variation in the color and increased amplitude of the scattered light which is emitted so that the brightness level of the illumination area is further improved.

Although in the whitening of the boundaries of the recesses 11H according to the second embodiment, imperfections which are sufficiently fine to give a matte or white finish are formed, whitening is not limited to the formation of these imperfections, but a metal reflecting film may be formed on these fine imperfections, or a white paint may be applied to the recess boundaries.

A flat optical source device having various applications may be constructed by replacing a conventional light guiding plate having a printed pattern with the light guiding plate according to this invention. Further, a large illumination area with a uniform brightness distribution, which was said to be impossible to achieve with a conventional sandblasted light guiding plate, can now be easily manufactured. Still further, many applications and modes of use which were impossible with a conventional light guiding plate having a printed pattern, are now possible.

In the method of manufacturing a light guiding plate according to this invention, equipment and materials costs are lower, design and manufacture are simpler, and the time required to complete a prototype device is much shorter compared to the case where a conventional printed pattern is used.

Hence, the brightness level of the illumination area can be increased and an excellent flat optical source device can be provided economically while reducing manufacturing costs.

What is claimed:

1. A method manufacturing a light guiding plate, comprising:

coating a surface of a transparent substrate with a resist film;

sandblast scanning said coated substrate with a first sand; and sandblast scanning said coated substrate with a second sand finer than said first sand before removing said layer of resist film, whereby imperfections are formed only in said recesses formed by said first scanning and not in areas of said transparent substrate protected by said resist film.

2. A method of manufacturing a light guiding plate as claimed in claim 1, wherein said imperfections are of the order of one light wavelength.

* * * * *